(12) United States Patent
Bromberg et al.

(10) Patent No.: US 11,099,746 B2
(45) Date of Patent: Aug. 24, 2021

(54) MULTI-BANK MEMORY WITH ONE READ PORT AND ONE OR MORE WRITE PORTS PER CYCLE

(71) Applicant: Marvell Israel (M.I.S.L) Ltd., Yokneam (IL)

(72) Inventors: Dror Bromberg, Michmoret (IL); Roi Sherman, Yokneam (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 245 days.

(21) Appl. No.: 15/092,634

(22) Filed: Apr. 7, 2016

(65) Prior Publication Data

US 2016/0320989 A1 Nov. 3, 2016

Related U.S. Application Data

(60) Provisional application No. 62/154,578, filed on Apr. 29, 2015.

(51) Int. Cl.
*G06F 3/06* (2006.01)
*G06F 12/00* (2006.01)
*G06F 13/16* (2006.01)

(52) U.S. Cl.
CPC .......... *G06F 3/0619* (2013.01); *G06F 3/0659* (2013.01); *G06F 3/0665* (2013.01); *G06F 3/0689* (2013.01); *G06F 12/00* (2013.01); *G06F 13/1684* (2013.01); *Y02D 10/00* (2018.01)

(58) Field of Classification Search
CPC .......... G06F 12/00; G06F 3/06; G06F 3/0619; G06F 3/0659; G06F 3/0665; G06F 3/0689; G06F 13/1684

USPC ......................................................... 711/114
See application file for complete search history.

(56) References Cited

U.S. PATENT DOCUMENTS

| | | | |
|---|---|---|---|
| 4,870,643 A | 9/1989 | Bultman et al. |
| 5,414,455 A | 5/1995 | Hooper et al. |
| 5,508,732 A | 4/1996 | Bottomley et al. |
| 5,581,479 A | 12/1996 | McLaughlin et al. |

(Continued)

FOREIGN PATENT DOCUMENTS

| | | |
|---|---|---|
| CN | 103455281 A | 12/2013 |
| WO | 2010071655 A1 | 6/2010 |
| WO | 2011075170 A1 | 6/2011 |

OTHER PUBLICATIONS

Bromberg et al., U.S. Appl. No. 15/130,980, filed Apr. 17, 2016.
(Continued)

*Primary Examiner* — Gautam Sain (57) ABSTRACT

A method for data storage includes, in a network element, receiving from packet-processing circuitry at least a read command and a write command, for execution in a memory array that includes multiple single-port memory banks. When the read command and the write command are to access different memory banks in the memory array, the read command and the write command are executed for the packet-processing circuitry in the different memory banks in a same memory-access cycle. When the read command and the write command are both to access a first memory bank, a second memory bank of the memory array is selected. The read command is executed in the first memory bank and the write command is executed in the second memory bank, in the same memory-access cycle.

10 Claims, 6 Drawing Sheets

(56) References Cited

U.S. PATENT DOCUMENTS

| | | | |
|---|---|---|---|
| 5,621,882 A | 4/1997 | Kakuta | |
| 5,636,139 A | 6/1997 | McLaughlin et al. | |
| 6,185,662 B1* | 2/2001 | Beyerlein | G06F 13/1663 |
| | | | 711/147 |
| 6,311,251 B1 | 10/2001 | Merritt et al. | |
| 6,397,324 B1 | 5/2002 | Barry et al. | |
| 6,557,053 B1* | 4/2003 | Bass | G06F 13/1673 |
| | | | 365/230.08 |
| 7,149,139 B1* | 12/2006 | Rosen | G06F 5/16 |
| | | | 365/221 |
| 7,428,618 B2 | 9/2008 | Najam et al. | |
| 7,437,472 B2 | 10/2008 | Rose | |
| 7,451,467 B2 | 11/2008 | Carver et al. | |
| 8,358,651 B1 | 1/2013 | Kadosh et al. | |
| 8,514,651 B2 | 8/2013 | Levy et al. | |
| 8,724,423 B1* | 5/2014 | Zhou | G11C 7/1075 |
| | | | 365/189.02 |
| 8,995,210 B1 | 3/2015 | Hagspiel et al. | |
| 2003/0046477 A1 | 3/2003 | Jeddeloh | |
| 2003/0120861 A1 | 6/2003 | Calle et al. | |
| 2005/0066135 A1* | 3/2005 | Yoshida | G06F 13/1642 |
| | | | 711/151 |
| 2009/0164696 A1 | 6/2009 | Allen et al. | |
| 2011/0138100 A1 | 6/2011 | Sinclair | |
| 2011/0289256 A1 | 11/2011 | Bartlett | |
| 2012/0127818 A1* | 5/2012 | Levy | G06F 13/16 |
| | | | 365/230.03 |
| 2012/0144103 A1* | 6/2012 | Ko | G11C 7/1075 |
| | | | 711/104 |
| 2013/0205183 A1* | 8/2013 | Fillingim | G06F 11/1044 |
| | | | 714/773 |
| 2013/0326149 A1 | 12/2013 | Battell et al. | |
| 2014/0047197 A1* | 2/2014 | Kokrady | G11C 8/16 |
| | | | 711/149 |
| 2014/0177324 A1* | 6/2014 | Liu | G11C 8/16 |
| | | | 365/154 |
| 2014/0282514 A1* | 9/2014 | Carson | G06F 9/45533 |
| | | | 718/1 |
| 2014/0362651 A1 | 12/2014 | Chang et al. | |
| 2016/0162359 A1 | 6/2016 | Kittner et al. | |

OTHER PUBLICATIONS

European Application # 16165893.5 Search Report dated Sep. 21, 2016.
European Application # 16165279.7 Search Report dated Sep. 30, 2016.
International Application # PCT/IB2016/00673 Search Report dated Oct. 5, 2016.
U.S. Appl. No. 15/130,980 office action dated Sep. 18, 2017.
EP Application # 16165893.5 office action dated Sep. 25, 2017.
CN Application # 201610273711.5 office action dated Nov. 26, 2019.
CN Application # 201610280155.4 office action dated May 25, 2020.

* cited by examiner

MULTI-BANK MEMORY WITH ONE READ PORT AND ONE OR MORE WRITE PORTS PER CYCLE

CROSS-REFERENCE TO RELATED APPLICATIONS

This application claims the benefit of U.S. Provisional Patent Application 62/154,578, filed Apr. 29, 2015, whose disclosure is incorporated herein by reference.

FIELD OF THE DISCLOSURE

The present disclosure relates generally to memory devices, and particularly to multi-port memory systems.

BACKGROUND

Various techniques for allowing simultaneous access to a memory are known in the art. For example, U.S. Pat. No. 8,514,651, whose disclosure is incorporated herein by reference, describes a memory device having a set of memory banks to store content data. At least two read requests to perform respective read memory operations in a first memory bank are received during a single clock cycle. One or more of the at least two requests are blocked from accessing the first memory bank, and in response: redundancy data associated with the first memory bank and different from content data stored therein is accessed, and, without accessing the first memory bank, at least a portion of the content data stored in the first memory bank is reconstructed based on the associated redundancy data. A first read memory operation is performed using the content data stored in the first memory bank, and a second read memory operation is performed using content data reconstructed i) without accessing the first memory bank and ii) based on the associated redundancy data.

The description above is presented as a general overview of related art in this field and should not be construed as an admission that any of the information it contains constitutes prior art against the present patent application.

SUMMARY

An embodiment that is described herein provides a method for data storage. The method includes, in a network element, receiving from packet-processing circuitry at least a read command and a write command, for execution in a memory array that includes multiple single-port memory banks. When the read command and the write command are to access different memory banks in the memory array, the read command and the write command are executed for the packet-processing circuitry in the different memory banks in a same memory-access cycle. When the read command and the write command are both to access a first memory bank, a second memory bank of the memory array is selected. The read command is executed in the first memory bank and the write command is executed in the second memory bank, in the same memory-access cycle.

In some embodiments, receiving at least the read command and the write command includes receiving the read command and multiple write commands, and, when two or more of the write commands are to access the first memory bank, selecting two or more second memory banks, and executing the two or more of the write commands in the respective second memory banks, all in the same memory-access cycle as the read command.

In some embodiments, the write command is initially intended for execution in the first memory bank in a first entry, which belongs to a stripe including multiple respective entries in the multiple memory banks, and selecting the second memory bank includes selecting a memory bank that holds a pre-designated redundant entry belonging to the stripe. In an embodiment, executing the write command in the second memory bank includes executing the write command in the redundant entry. In an example embodiment, the method further includes re-designating the first entry in the first memory bank to serve as the redundant entry.

In an embodiment, the write command specifies a logical address that is initially mapped to a first entry in the first memory bank, and executing the write command in the second memory bank includes re-mapping the logical address to a second entry in the second memory bank in which the write command is executed. In another embodiment, the read command and the write command specify respective logical addresses in a logical address space that is larger than a physical memory space of the memory array.

In some embodiments, selecting the second memory bank and executing the read command and the write command includes querying a logical-to-physical mapping table that maps logical addresses specified in the read and write commands to respective physical addresses in the memory array. In a disclosed embodiment, querying the logical-to-physical mapping table includes storing the logical-to-physical mapping table in one or more multi-port memories. In an alternative embodiment, querying the logical-to-physical mapping table includes storing the logical-to-physical mapping table in a plurality of Flip-Flops (FFs).

In some embodiments, the method further includes storing, in a First-In First-Out (FIFO) buffer, addresses in which respective received write commands were executed in the memory array, and, in response to receiving read commands, reading the addresses in accordance with an order of the addresses in the FIFO buffer.

There is additionally provided, in accordance with an embodiment that is described herein, a memory system used in a network element. The memory system includes a memory array and control logic. The memory array includes multiple single-port memory banks. The control logic is configured to receive from packet-processing circuitry of the network element at least a read command and a write command for execution in the memory array, to execute the read command and the write command for the packet-processing circuitry in different memory banks in a same memory-access cycle when the read command and the write command are to access different memory banks, and, when the read command and the write command are both to access a first memory bank, to select a second memory bank of the memory array, and to execute the read command in the first memory bank and the write command in the second memory bank, in the same memory-access cycle. In some embodiments, a network switch includes the disclosed memory system.

The present disclosure will be more fully understood from the following detailed description of the embodiments thereof, taken together with the drawings in which:

DETAILED DESCRIPTION OF EMBODIMENTS

Embodiments that are described herein provide improved memory systems and associated methods, which are able to execute a read command and one or more write commands in the same clock cycle. In the disclosed embodiments, a memory system is implemented using a memory array comprising N single-port memory banks. Although each individual memory bank is capable of executing a single command (read or write) in each clock cycle, the memory system as a whole is designed to execute a read command and one or more write commands per clock cycle.

In some embodiments, the memory system comprises control logic that receives read and write commands from one or more clients. The read and write commands specify logical addresses, in a logical address space that is exposed to the clients. The various entries of the N memory banks are identified by physical addresses in a physical address space. The control logic manages a logical-to-physical mapping table that maps between the logical addresses and the corresponding physical addresses.

In an embodiment, each row of the memory array, which comprises N corresponding entries of the N memory banks, is regarded as a stripe. For supporting one read command and one write command per clock cycle, the control logic designates one entry per stripe to serve as a redundant entry. The physical address space of the memory system is thus larger than the logical memory space, to accommodate the redundant entries. The logical-to-physical mapping table also indicates the location of the redundant entry per stripe. As will be described below, the locations of the redundant entries in the stripes are not fixed, but rather change during the operation of the memory system.

In an embodiment, the control logic receives a read command and a write command for execution in the same clock cycle. The control logic executes the read command as requested. The control logic checks whether the read command and the write command access the same memory bank or not. If the write command accesses a different memory bank, the control logic executes the write commend as requested, as well, in the same clock cycle.

If, on the other hand, the write command accesses the same memory bank as the read command, inasmuch as the memory banks have only a single port, it is impossible to execute both commands in the same clock cycle. In such a case, the control logic selects an alternative memory bank in which to execute the write command. In an embodiment, the control logic selects the memory bank that holds the redundant entry of the stripe to which the original destination entry of the write command belongs.

The control logic then writes the data provided in the write command to the redundant entry of the stripe, and updates the logical-to-physical mapping table to reflect the physical address in which the data has been written. Following the update, the logical address that was specified in the write command is mapped to the entry that previously served as a redundant entry. The entry that was previously mapped to the logical address specified in the write command is re-assigned to serve as the redundant entry of the stripe.

In an embodiment, the entire process above is completed during the same clock cycle in which the read command is executed. In the next clock cycle the memory system is ready to execute new read and write commands.

In alternative embodiments, the above technique is extended and generalized to carry out a read command and any predefined number K of write commands per clock cycle. In these embodiments, each stripe has K redundant entries. Various implementations of the disclosed memory system and its components are described herein. Example applications, including a First-In First-Out (FIFO) memory application, are also described.

The disclosed memory systems enable execution of multiple commands per clock cycle, even though the underlying memory devices comprise single-port memories. As such, the disclosed techniques provide fast and parallel storage, while at the same time retaining a low clock rate, low cost, small size and low power consumption.

Figure 1:
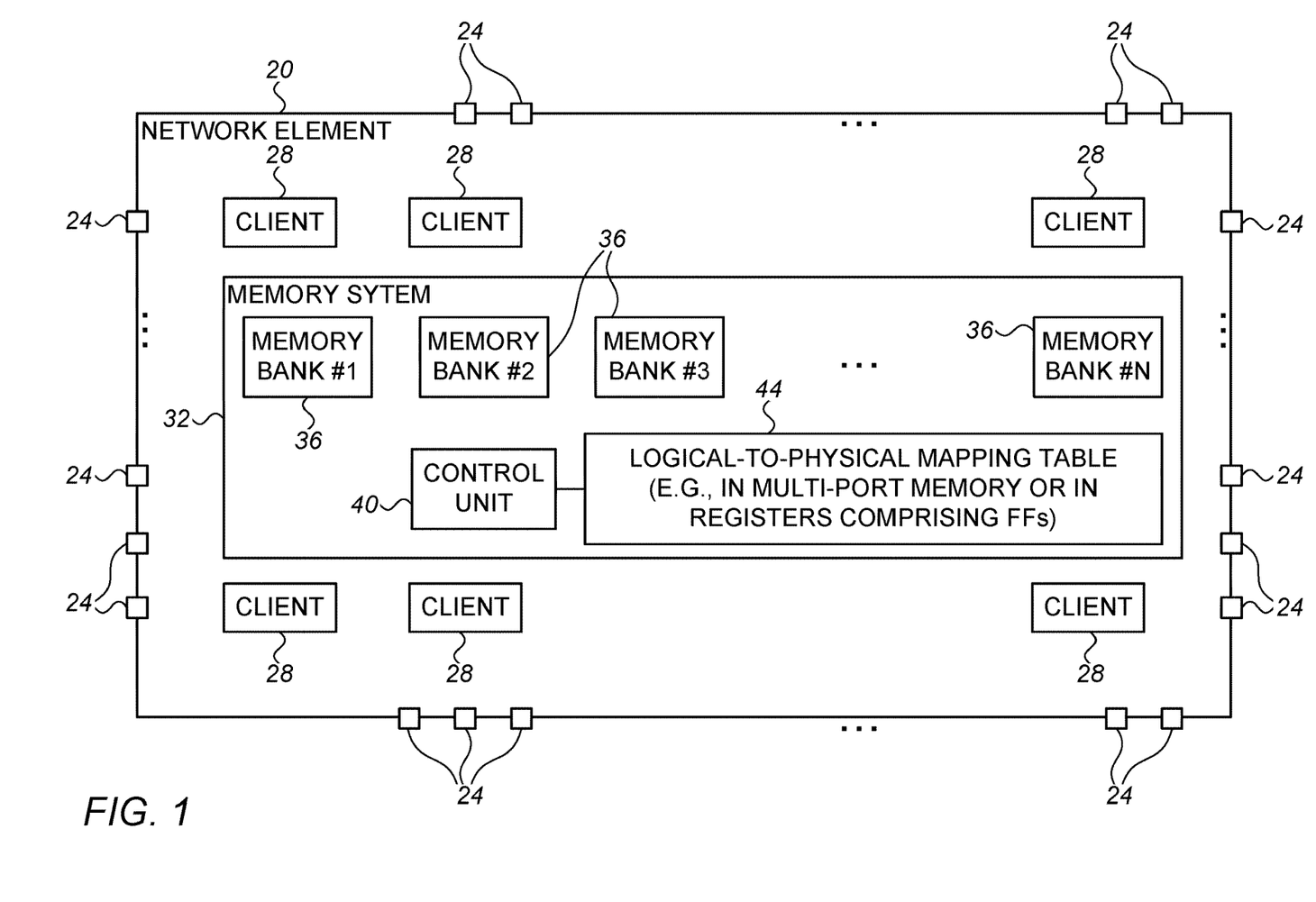
FIG. 1 is a block diagram that schematically illustrates a network element, in accordance with an embodiment that is described herein.

FIG. 1 is a block diagram that schematically illustrates a network element 20, in accordance with an embodiment that is described herein. In the present example, network element 20 comprises a network switch that forwards communication packets in a communication network. In alternative embodiments, network element 20 comprises any other suitable type of network element, such as a router or a bridge.

In the embodiment of FIG. 1, network element 20 comprises multiple ports 24 for receiving and transmitting packets, and suitable circuitry for processing the packets, e.g., including for example circuitry at least for buffering packets during packet processing operations and for forwarding packets from one port to another. In the present example, network element 20 comprises one or more clients 28, and a memory system 32 that stores data used by clients 28 for processing packets. Clients 28 typically comprise various processing units or processing cores, configured as processing engines in a processing pipeline, as a plurality of run to completion processors or in some other suitable arrangement, of network element 20, but may generally comprise any suitable module that stores and retrieves data.

In some embodiments, memory system 32 comprises a plurality of N memory units that are referred to herein as memory banks 36, a control unit 40, and a logical-to-physical mapping table 44. Control unit 40, also referred to herein as control logic, manages the storage of data in memory banks 36, and communicates with clients 28. Logical-to-physical mapping table 44 maps logical addresses (as specified in the read and write commands issued by clients 28) to physical addresses (physical storage locations in memory banks 36).

Typically, each memory bank 36 comprises a single-port memory, meaning it is capable of executing a single command, e.g., one read command or one write command, per memory access cycle, which generally corresponds to a clock cycle in an embodiment. The clock cycles in question are those of the clock signal that clocks memory banks 36. In the present context, clock cycles are also referred to herein as memory-access cycles, and the two terms are used interchangeably. In the present example, each memory bank 36 comprises a single-port Static Random Access Memory (SRAM). Alternatively, however, memory banks 36 are implemented using any other suitable type of memory, e.g., Dynamic Random Access Memory (DRAM).

Although each memory bank 36 is capable of executing no more than a single read command or a single write command per clock cycle, memory system 32 as a whole is designed, as will be explained below in detail, to execute one read command and K write commands per clock cycle. K is a predefined integer number.

The configurations of network element 20 and memory system 32 shown in FIG. 1 are example configurations, which are depicted solely for the sake of clarity. In alternative embodiments, any other suitable network element and/or memory system configuration can also be used. Elements of network element 20 and memory system 32 that are not mandatory for understanding of the disclosed techniques have been omitted from the figure for the sake of clarity.

The different elements of network element 20 and memory system 32 are typically implemented using dedicated hardware, such as using one or more Application-Specific Integrated Circuits (ASICs), Field-Programmable Gate Arrays (FPGAs) and/or RF Integrated Circuits (RFICs). Alternatively, some elements of network element 20 and/or memory system 32, e.g., control unit 40 (also referred to as control logic) or parts thereof, may be implemented using software executing on programmable hardware, or using a combination of hardware and software elements.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
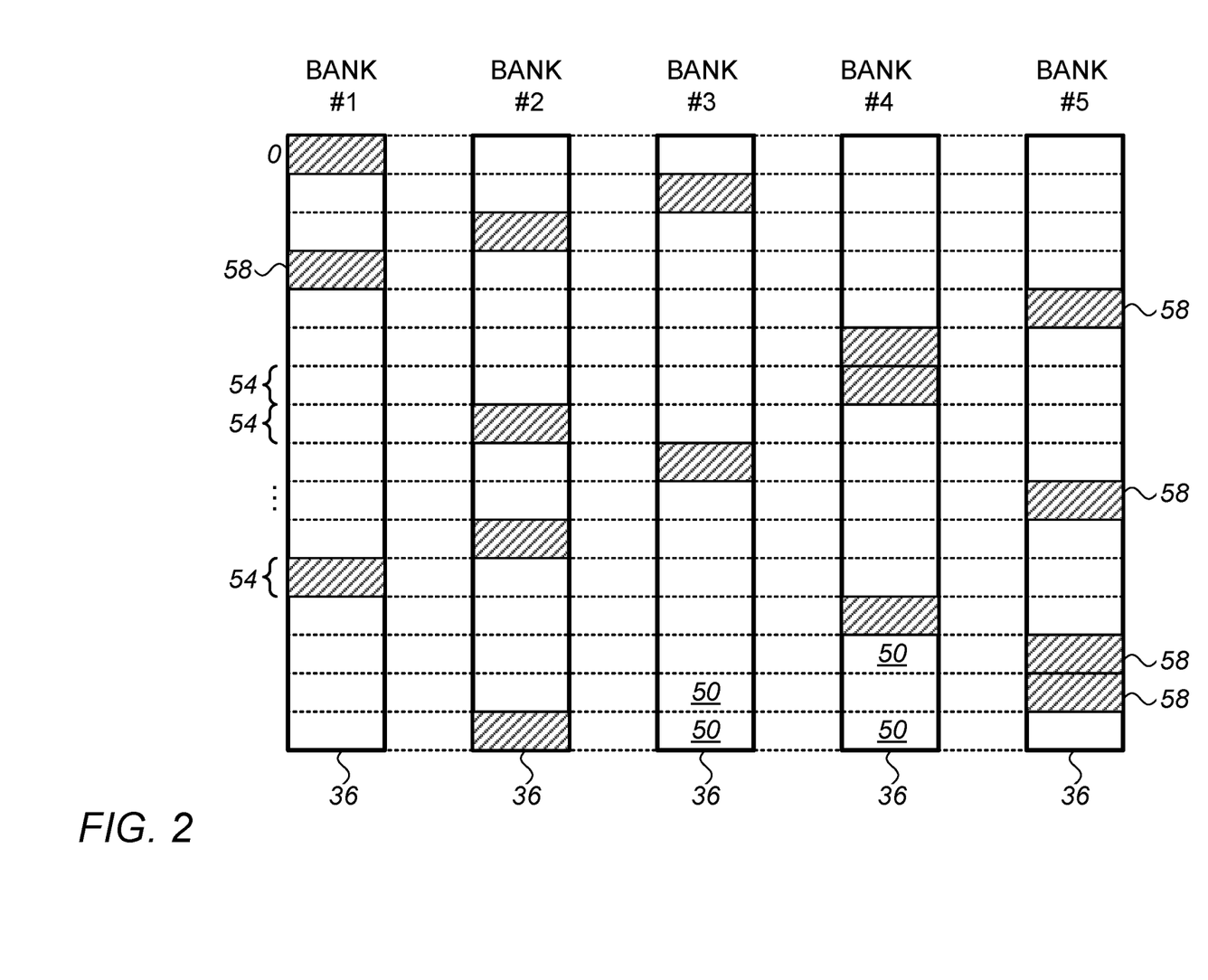
FIG. 2 is a diagram that schematically illustrates configuration of data in a memory system, in accordance with an embodiment that is described herein.

FIG. 2 is a diagram that schematically illustrates the configuration of data in memory banks 36, in accordance with an embodiment that is described herein. In the present non-limiting example, N=5, and memory banks 36 are denoted BANK #1 . . . BANK #5. Memory system 32 in the present example is designed for executing one read command and one write command per clock cycle, i.e., K=1.

In the embodiment of FIG. 2, each memory bank 36 comprises multiple entries 50. Each entry 50 holds a data word or other basic data unit. Each group of N corresponding entries in the N respective memory banks is referred to as a stripe 54. In other words, the $m^{th}$ entry of BANK #1, the $m^{th}$ entry of BANK #2, the $m^{th}$ entry of BANK #3, the $m^{th}$ entry of BANK #4 and the $m^{th}$ entry of BANK #5 are referred to jointly as the $m^{th}$ stripe 54.

In the present example, in which K=1, control unit 40 designates one of the entries in each stripe 54 to serve as a redundant entry 58. In the general case, in which memory system 32 is designed for executing K write commands per clock cycle, control unit 40 designates K entries in each stripe 54 to serve as redundant entries 58. Redundant entries 58 are marked with a hashing pattern in the figure. As will be explained below, the locations of the redundant entries in the stripes are not fixed, but rather vary over time.

In some embodiments, each entry 50 in BANK #1 . . . BANK #5 is identified by a respective physical address. The collection of the physical addresses is referred to as the physical memory space of memory system 32. The logical memory space of memory system, which is the memory space exposed to clients 28, has a size corresponding to the total number of the non-redundant entries. Thus, the logical memory space of memory system 32 is smaller than the physical memory space, in an embodiment. The size of the logical memory space corresponds to the total amount of data that can be stored in memory system 32. The difference in size between the logical and physical memory spaces corresponds to the number of redundant entries 58.

Typically, clients 28 issue write and read commands that specify logical addresses, and are not aware of the physical addresses in which the data is actually stored. Logical-to-physical mapping table 44 (FIG. 1) holds the current mapping between each logical address and the corresponding physical address. Control unit 40 uses table 44 to translate between logical and physical addresses when executing write and read commands. Typically, mapping table 44 also indicates the location of the redundant entry 58 (or redundant entries, for K>1) of each stripe 54.

As will be now explained in detail, the use of redundant entries 58 enables control unit 40 to execute one read command and K write commands per clock cycle, even when memory banks 36 are single-port memories.

With reference to FIG. 2, consider a read command and a write command that are to be executed in the same clock cycle. If the read command and the write command access entries 50 that reside in different memory banks 36, control unit 40 is able to execute the read command and the write command as requested.

If, on the other hand, the read command and the write command access entries 50 that happen to reside in the same memory bank 36, the collision has to be resolved because the memory bank can only execute one command per clock cycle. In such an event, control unit 40 executes the read command as specified, i.e., reads the data from the specified entry 50. The write command, however, is not executed in the specified entry 50, but in the redundant entry 58 of the same stripe 54. The control unit then updates logical-to-physical mapping table 44 accordingly.

Since for K=1 each stripe 54 has a redundant entry 58, a collision between a read command and one write command is guaranteed to be resolved successfully. In the general case, each stripe comprises K redundant entries 58. Therefore, even the worst-case collision between a read command and K write command, which occurs when all K+1 commands are to access the same memory bank 36, is guaranteed to be resolvable.

Figure 3:
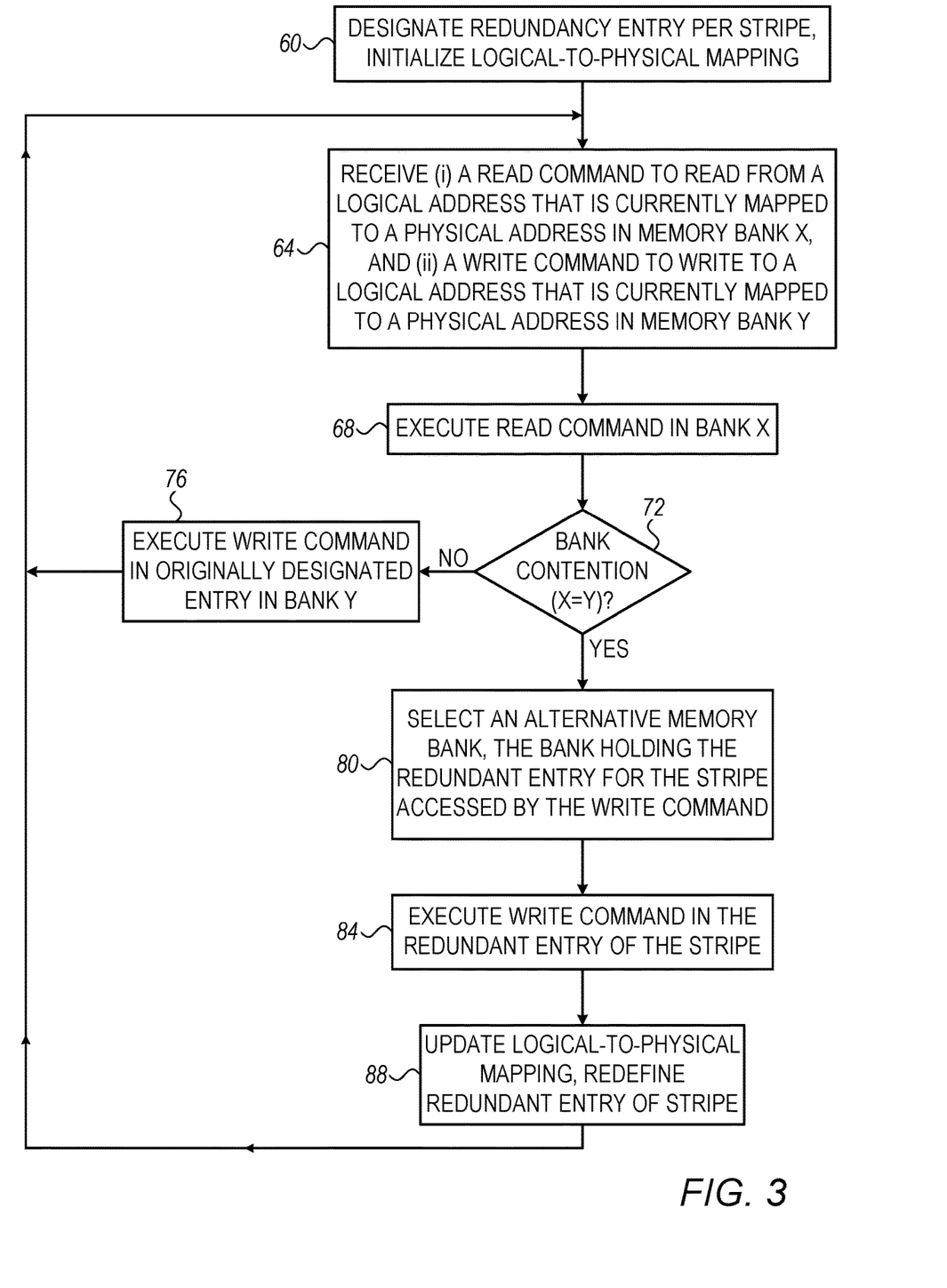
FIG. 3 is a flow chart that schematically illustrates a method for simultaneous execution of a read command and a write command in a memory system, in accordance with an embodiment that is described herein.

FIG. 3 is a flow chart that schematically illustrates a method for simultaneous execution of a read command and a write command in memory system 32, in accordance with an embodiment that is described herein. The method of FIG. 3 refers to the case of K=1, i.e., execution of one read command and one write command per clock cycle, for the sake of clarity. The method is applicable in a similar manner, with suitable adaptation, for any other value of K.

Figure 4A:
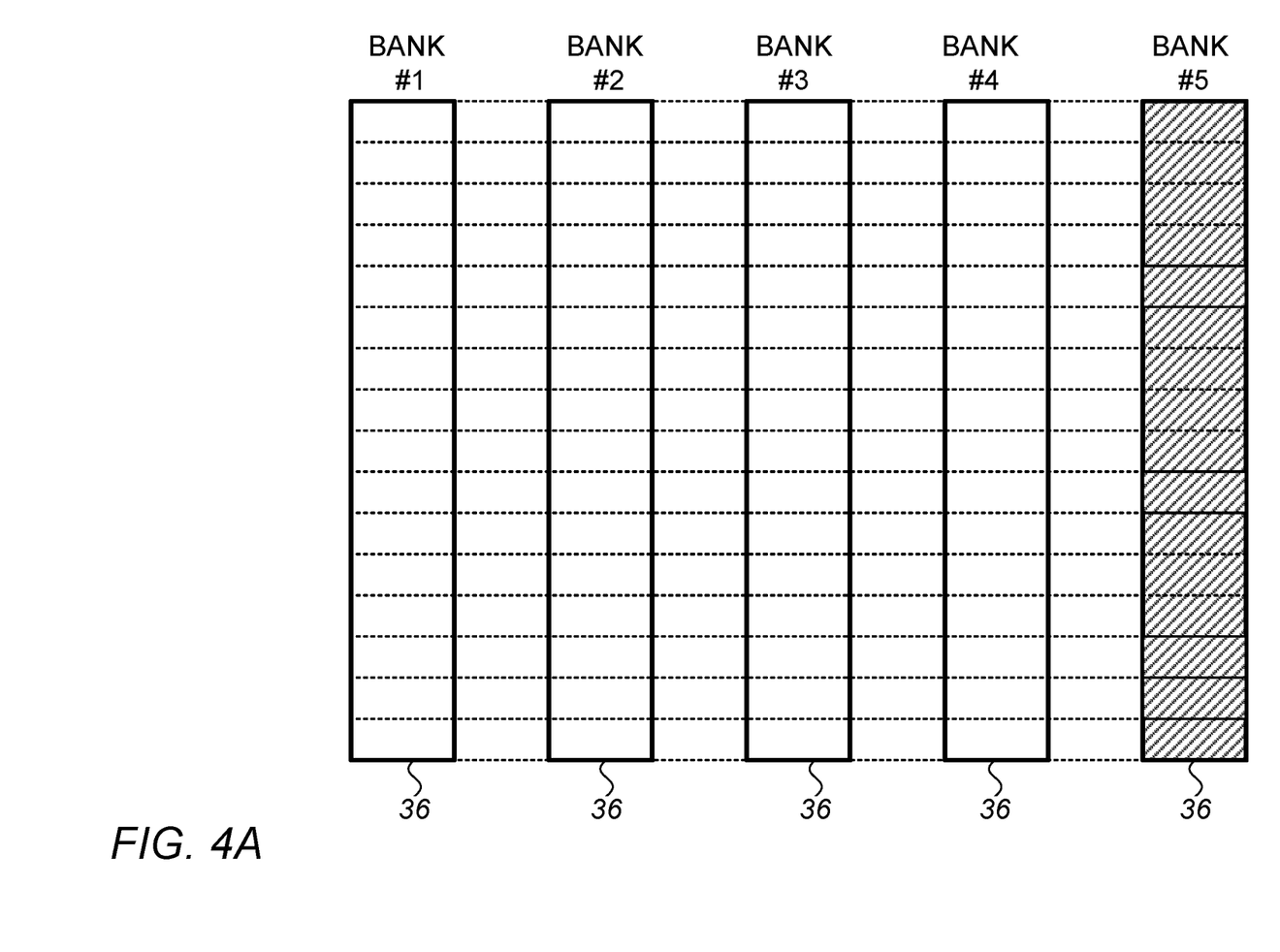
FIGS. 4A and 4B are diagrams that schematically illustrate (i) an initial state of the memory system of FIG. 2 and (ii) a process of resolving a collision between a read command and a write command addressed to the same memory bank, respectively, in accordance with an embodiment that is described herein.

The method begins with control unit 40 designating a redundant entry 58 per stripe 54, and initializing logical-to-physical mapping table 44, at an initialization operation 60. An example initial designation is seen in FIG. 4A below. In this example, the redundant entry of each stripe is initially designated in BANK #5. The initial logical-to-physical mapping in table 44 maps each logical address to a respective entry 50 in BANK #1 . . . BANK #4. This initial designation, however, is not mandatory, and control unit 40 may apply any other suitable initial designation in alternative embodiments.

At a command input operation 64, control unit 40 receives a read command and a write command from one or more clients 28. The read command and the write command are to be executed in memory system 32 in the same clock cycle.

The read command requests readout of data from a logical address that is mapped to a physical address residing in a memory bank 36 denoted X. The write command requests writing data to a logical address that is mapped to a physical address residing in a memory bank 36 denoted Y.

At a read execution operation 68, control unit 40 reads the data from the specified entry 50 in bank X as requested, and returns the read data to the requesting client 28. Thus, in an embodiment, the read command is given unconditional priority over the write command.

At a collision checking operation 72, control unit 40 checks whether the write command accesses the same memory bank 36 as the read command, i.e., whether X=Y. If the write command accesses a different memory bank (X≠Y), control unit 40 writes the data to the specified entry 50 in memory bank Y as requested, at a normal write operation 76. The write command of operation 76 is executed during the same clock cycle as the read command of operation 68. The method then loops back to operation 64, in which memory system 32 is ready to receive the next read and write commands.

Otherwise, if the write command accesses the same memory bank as the read command (X=Y), control unit 40 carries out a collision resolution process that will still enable the write command to be executed in the same clock cycle as the read command. This process is also demonstrated in FIG. 4B below.

The collision resolution process begins with control unit 40 selecting an alternative memory bank 36 in which to execute the write command, at an alternative bank selection operation 80. The alternative memory bank is the bank that holds the redundant entry 58 of the same stripe 54 as the entry 50 originally accessed by the write command.

In other words, if the write command was supposed to write data in the $m^{th}$ entry 50 on row of bank Y(=X), belonging to the $m^{th}$ stripe 54, control unit 40 looks-up table 44, and selects the memory bank that holds the redundant entry 58 of that stripe. The $m^{th}$ row of this memory bank is known to hold a redundant entry 58. Control unit 40 writes the data provided in the write command into the redundant entry of the $m^{th}$ stripe, i.e., in the $m^{th}$ entry of the selected alternative memory bank, at a collision write operation 84. The write command of operation 84 is executed during the same clock cycle as the read command of operation 68.

At a mapping updating operation 88, control unit 40 updates the logical-to-physical mapping in table 44 as follows:

The logical address specified in the write command is re-mapped, and now points to a physical address in the same stripe but in the alternative bank (the physical address in which the data was stored at operation 84, which up to now was the redundant entry of the stripe).

The physical address that was previously mapped to the logical address specified in the write command (in bank X(=Y)) is now designated to serve as the redundant entry of the stripe.

The method then loops back to operation 64 above for receiving and executing subsequent read and write commands.

Figure 4B:
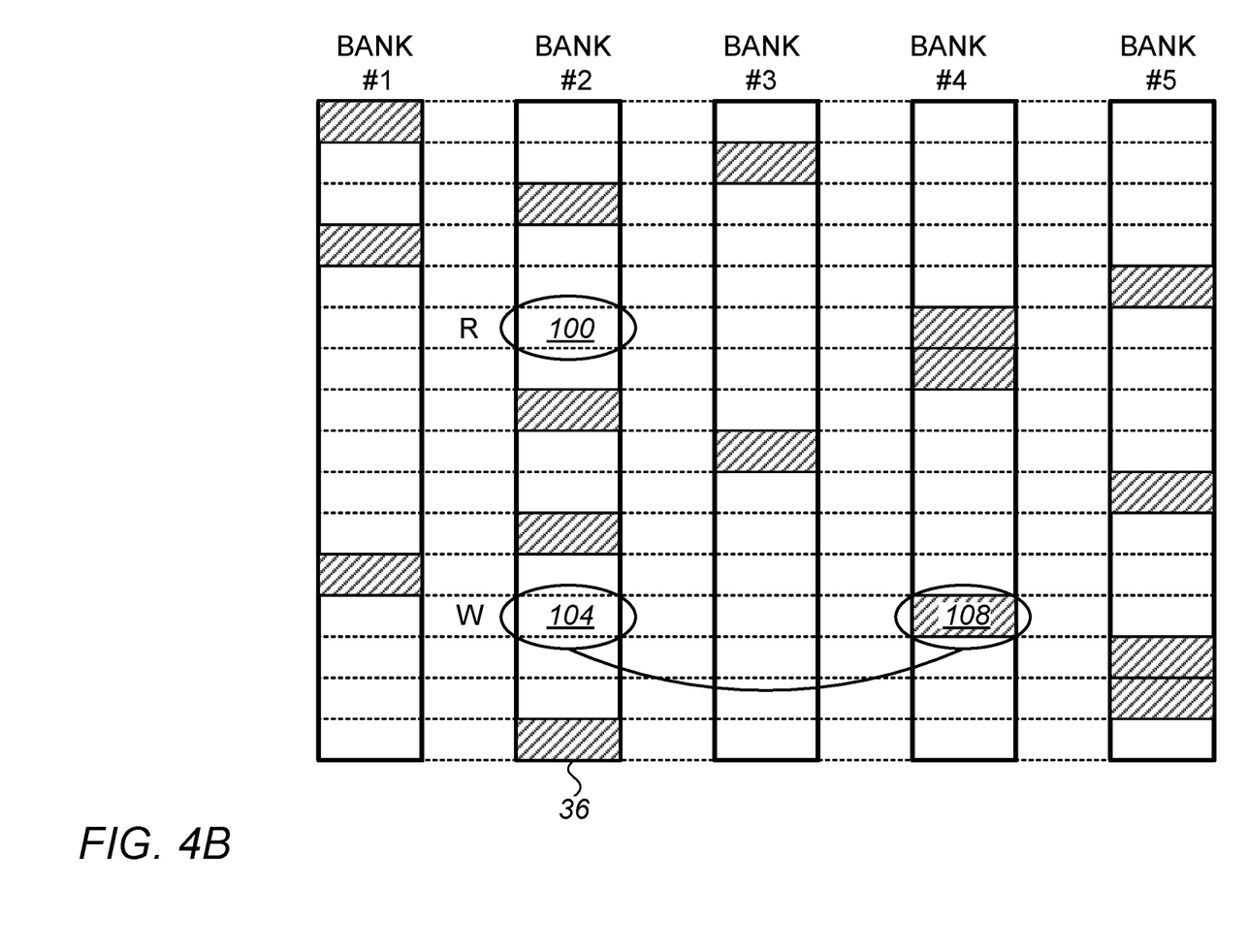

As can be seen from the description above, the locations of redundant entries 58 within stripes 54 is not fixed. For example, whenever a collision is detected and resolved, the current redundant entry in a certain stripe is used for executing the write command, and the original destination entry of this write command is reassigned as the redundant entry of the stripe. FIGS. 4A and 4B below demonstrate this process.

FIG. 4A is a diagram that schematically illustrates an initial state of memory banks 36, in accordance with an embodiment that is described herein. In this non-limiting example, the redundant entries of the various stripes (marked with a hashing pattern) are initially assigned in BANK #5.

FIG. 4B is a diagram that schematically illustrates the state of memory banks 36 at a later point in time, in accordance with an embodiment that is described herein. As can be seen in the figure, after executing multiple read and write commands, the redundant entries (marked with a hashing pattern) are distributed in various locations in the different stripes.

FIG. 4B also demonstrates the above-described process of resolving a collision between a read command and a write command addressed to the same memory bank. In the present example, a read command requests readout of data from a logical address ADD_R that is mapped to an entry 100 (marked "R"). In the same clock cycle, a write command requests writing of data to a logical address ADD_W that is mapped to an entry 104 (marked "W").

Both entries 100 and 104 happen to reside in the same memory bank—BANK #2. Since BANK #2 is a single-port memory, it is impossible to execute both commands in the same clock cycle, and the collision needs to be resolved.

In an embodiment, control unit 40 reads the data from entry 100 as requested. In order to resolve the collision, control unit 40 selects an alternative bank in which to execute the write command, instead of entry 104. In an embodiment, control unit 40 selects the memory bank that holds the redundant entry of the stripe of entry 104. In the example of FIG. 4B, this bank is BANK #4, and the redundant entry in question is marked 108.

Control unit 40 writes the data provided in the write command in entry 108 instead of in entry 104, in the same clock cycle as the readout from entry 100. Control unit 40 also updates the logical-to-physical mapping in table 44 to reflect that logical address ADD_W is now mapped to the physical address of entry 108. Subsequent read commands from this logical address will thus read from entry 108. In addition, control unit 40 re-assigns entry 104 to serve as the redundant entry of the stripe. This assignment is also updated in table 44.

As can be seen from the description above, mapping table 44 should be accessed at a higher rate than the clock rate used for executing the read and write commands in memory banks 36. For example, when resolving a worst-case collision, control unit 40 accesses mapping table 44 once for finding the physical address in which to execute the read command, and twice per each write command (once for finding the physical address in which to execute the write command, and once for updating the mapping for the logical address ADD_W and the new designation of the redundant entry).

In total, mapping table 44 is accessed 1+2K times during a single clock cycle. To support this access rate without increasing the internal clock rate of memory system 32, in some embodiments mapping table 44 is implemented using multi-port memory. In alternative embodiments the mapping table is implemented using discrete Flip-Flops (FFs), e.g., arranged in registers.

In one example embodiment, for K=1, mapping table 44 is implemented using a pair of 2-port RAMS (which typically occupy a smaller area than FFs). The mapping table is duplicated, i.e., control unit 40 stores two respective copies of mapping table 44 on the two 2-port RAMS. In order to find the physical address for executing the read command, control unit 40 accesses the copy of table 44 on one of the RAMS. In order to find the physical address for executing the write command, control unit 40 accesses the copy of table 44 on the other RAM. When updating the mapping and the location of the redundant entry, control unit 40 updates both copies on both RAMS.

The above implementation refers to K=1, for the sake of clarity. In alternative embodiments, mapping table 44 can be implemented in a similar manner for any K (any number of write commands per clock cycle) using a larger number of duplicate RAMS, and/or using multi-port RAMS having a larger number of ports. In an embodiment, the multi-port RAMS used for implementing mapping table 44 are themselves implemented from single-port RAMS using the structure of memory system 32.

Figure 5:
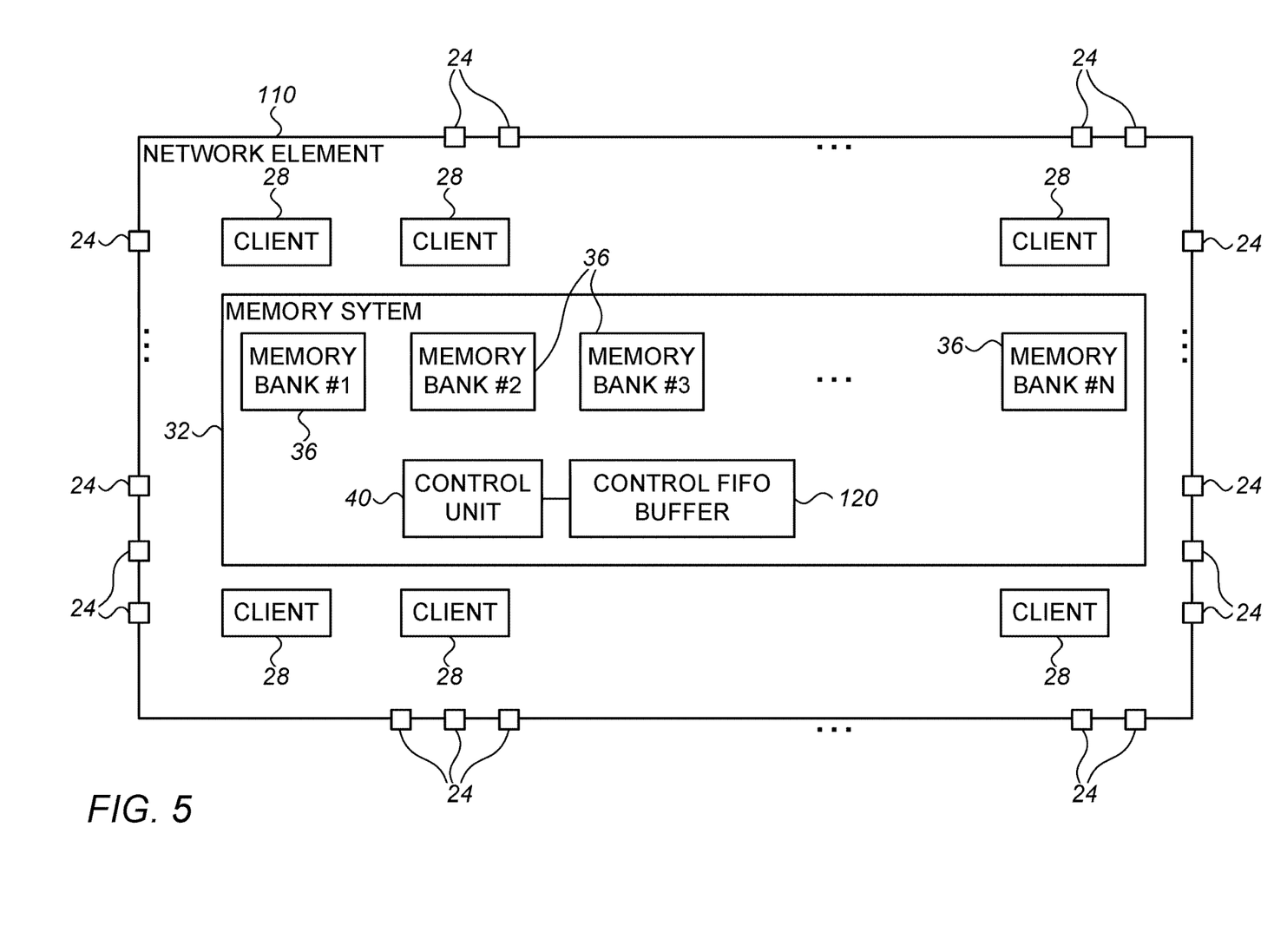
FIG. 5 is a block diagram that schematically illustrates a network element, in accordance with an embodiment that is described herein.

FIG. 5 is a block diagram that schematically illustrates a network element 110, in accordance with an embodiment that is described herein. Network element 110 of FIG. 5 is identical to network element 20 of FIG. 1, except that (i) logical-to-physical mapping table 44 is omitted, and (ii) memory system 32 further comprises a control First-In First-Out (FIFO) buffer 120. In this embodiment, memory system 32 is managed and used as a First-In First-Out (FIFO) buffer memory. Such a FIFO is useful, for example, for implementing a packet queue for absorbing bursts of packets in network element 20, for storing packets while a reduced size descriptor containing header information of the packet is processed, for implementing a reorder block in a statistical memory, or for any other suitable purpose. In a FIFO implementation, typically there is no need for logical-to-physical address translation, since the data is not accessed by address. Therefore, in these embodiments, mapping table 44 is typically omitted.

In these embodiments, control unit 40 typically receives data items (e.g., packets) in a certain order, stores the data items in memory banks 36 using the techniques described above, and responds to each read command by returning the data item that was received the earliest. For this purpose, control unit 40 typically manages a small control FIFO buffer, in the present example control FIFO buffer 120, which tracks the physical addresses of the data items in the order they were received.

FIG. 5 is a block diagram that schematically illustrates a network element 110, in accordance with an embodiment that is described herein. Network element 110 of FIG. 5 is identical to network element 20 of FIG. 1, except that (i) logical-to-physical mapping table 44 is omitted, and (ii) memory system 32 further comprises a control First-In First-Out (FIFO) buffer 120. In this embodiment, memory system 32 is managed and used as a First-In First-Out (FIFO) buffer memory. Such a FIFO is useful, for example, for implementing a packet queue for absorbing bursts of packets in network element 20, for storing packets while a reduced size descriptor containing header information of the packet is processed, for implementing a reorder block in a statistical memory, or for any other suitable purpose. In a FIFO implementation, typically there is no need for logical-to-physical address translation, since the data is not accessed by address. Therefore, in these embodiments, mapping table 44 is typically omitted.

In these embodiments, control unit 40 typically receives data items (e.g., packets) in a certain order, stores the data items in memory banks 36 using the techniques described above, and responds to each read command by returning the data item that was received the earliest. For this purpose, control unit 40 typically manages a small control FIFO buffer, in the present example control FIFO buffer 120, which tracks the physical addresses of the data items in the order they were received.

In various embodiments, the methods and systems described herein are applicable in various applications. One example application is storage of multicast traffic, e.g., in Internet Protocol Television (IPTV) application transmission. In such an application, a burst of multiple duplicate copies of a packet should be sent to multiple target ports of a network element, en-route to multiple users. The disclosed techniques are well suited for storing such duplicate copies.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
   in control logic circuitry of a network element, receiving from packet-processing circuitry read commands and write commands that do not specify respective memory addresses, for execution in a memory array that comprises multiple single-port memory banks; and
   executing the read commands and the write commands in the memory array, by:
      when a read command from among the received read commands, and a write command from among the received write commands, are to access different memory banks in the memory array, assigning by the control logic circuitry a physical address for the write command, and executing the read command and the write command for the packet-processing circuitry in the different memory banks in a same memory-access cycle;
      when the read command and the write command are both to access a first memory bank, selecting a second memory bank of the memory array, assigning the physical address, by the control logic circuitry, for the write command in the second memory bank, and executing the read command in the first memory bank and the write command in the second memory bank, in the same memory-access cycle;
      storing by the control logic circuitry, in a control First-In First-Out (FIFO) buffer, in an order-of-arrival in which the write commands were received, physical addresses that were assigned by the control logic circuitry to the write commands; and
      responding to the read commands following the order-of arrival in which the write commands were received, by responding to each of the read commands with a respective data item stored by an earliest one of the write commands at an earliest one of the physical addresses stored in the control FIFO buffer.

2. The method according to claim 1, wherein receiving at least the read command and the write command comprises receiving the read command and multiple write commands, and, when two or more of the write commands are to access the first memory bank, selecting two or more second memory banks, and executing the two or more of the write commands in the respective second memory banks in the same memory-access cycle as the read command.

3. The method according to claim 1, wherein the write command is initially intended for execution in the first memory bank in a first entry, which belongs to a stripe comprising multiple respective entries in the multiple memory banks, and wherein selecting the second memory bank comprises selecting a memory bank that holds a pre-designated redundant entry belonging to the stripe.

4. The method according to claim 3, wherein executing the write command in the second memory bank comprises executing the write command in the redundant entry.

5. The method according to claim 4, comprising re-designating the first entry in the first memory bank to serve as the redundant entry.

6. A memory system in a network element, the memory system comprising:
- a memory array comprising multiple single-port memory banks;
- a control First-In First-Out (FIFO) buffer; and control logic circuitry, which:
    - receives from packet-processing circuitry of the network element read commands and write commands that do not specify respective memory addresses, for execution in the memory array; and
    - executes the read commands and the write commands in the memory array, by:
        - when a read command from among the received read commands, and a write command from among the received write commands, are to access different memory banks, assigning a physical address for the write command, and executing the read command and the write command for the packet-processing circuitry in different memory banks in a same memory-access cycle;
        - when the read command and the write command are both to access a first memory bank, selecting a second memory bank of the memory array, assigning the physical address for the write command in the second memory bank, and executing the read command in the first memory bank and the write command in the second memory bank, in the same memory-access cycle;
        - storing by the control logic circuitry, in the control FIFO buffer, in an order-of-arrival in which the write commands were received, physical addresses that were assigned by the control logic circuitry to the write commands; and
        - responding to the read commands following the order-of arrival in which the write commands were received, by responding to each of the read commands with a respective data item stored by an earliest one of the write commands at an earliest one of the physical addresses stored in the control FIFO buffer.

7. The memory system according to claim 6, wherein the control logic circuitry is configured to receive the read command and multiple write commands, and, when two or more of the write commands are to access the first memory bank, to select two or more second memory banks, and to execute the two or more of the write commands in the respective second memory banks in the same memory-access cycle as the read command.

8. The memory system according to claim 6, wherein the write command is initially intended for execution in the first memory bank in a first entry, which belongs to a stripe comprising multiple respective entries in the multiple memory banks, and wherein the control logic circuitry is configured to select a memory bank that holds a pre-designated redundant entry belonging to the stripe, and to execute the write command in the redundant entry.

9. The memory system according to claim 8, wherein the control logic circuitry is configured to re-designate the first entry in the first memory bank to serve as the redundant entry.

10. A network switch comprising the memory system of claim 6.

* * * * *